United States Patent [19]

Watson et al.

[11] 4,341,599

[45] Jul. 27, 1982

[54] HEATING APPARATUS

[76] Inventors: W. Keith R. Watson, P.O. Box 1537, Rancho Santa Fe, Calif. 92067; Knoxie C. DeLise, 9043 Harmony Grove Rd., Escondido, Calif. 92025

[21] Appl. No.: 200,530

[22] Filed: Oct. 24, 1980

[51] Int. Cl.³ ............................................. B01D 3/00
[52] U.S. Cl. ............................... 202/176; 202/180; 202/181; 202/197; 202/234; 203/21; 203/DIG. 14; 203/DIG. 25; 203/40
[58] Field of Search ............... 126/400, 374, 375, 381, 126/382; 219/4.9, 4 A, 13 A; 202/180, 181, 234, 197, 176; 203/40, 21, DiG. 14, DIG. 25

[56] References Cited

U.S. PATENT DOCUMENTS

| | | | |
|---|---|---|---|
| 901,645 | 10/1908 | Perry | 202/180 |
| 1,762,522 | 6/1930 | Newell | 122/32 |
| 1,785,098 | 12/1930 | Seidel | 122/32 |
| 1,931,838 | 10/1933 | Berard | 202/180 |
| 2,543,001 | 2/1951 | Dean | 202/197 |
| 2,680,708 | 6/1954 | Cook | 203/40 |
| 3,063,681 | 11/1962 | Duguid | 257/40 |
| 3,315,735 | 4/1967 | Stranko | 165/108 |
| 3,399,718 | 9/1968 | Phillips | 165/39 |
| 4,199,409 | 4/1980 | Shraba | 203/DIG. 25 |

*Primary Examiner*—Samuel Scott
*Assistant Examiner*—G. Anderson
*Attorney, Agent, or Firm*—William W. Haefliger

[57] ABSTRACT

Apparatus usable to heat fluid comprises:
(a) a steam vessel having an inlet for water and an outlet for steam,
(b) heating means associated with the vessel to heat water received therein and produce steam, and
(c) a condenser connected with the vessel outlet to receive steam, the condenser adapted to extend in heat transfer relation with the fluid to heat that fluid in response to condensation of steam in said condenser, the condenser having a condensate outlet, and
(d) other means to remove solid particles from the vessel.

17 Claims, 4 Drawing Figures

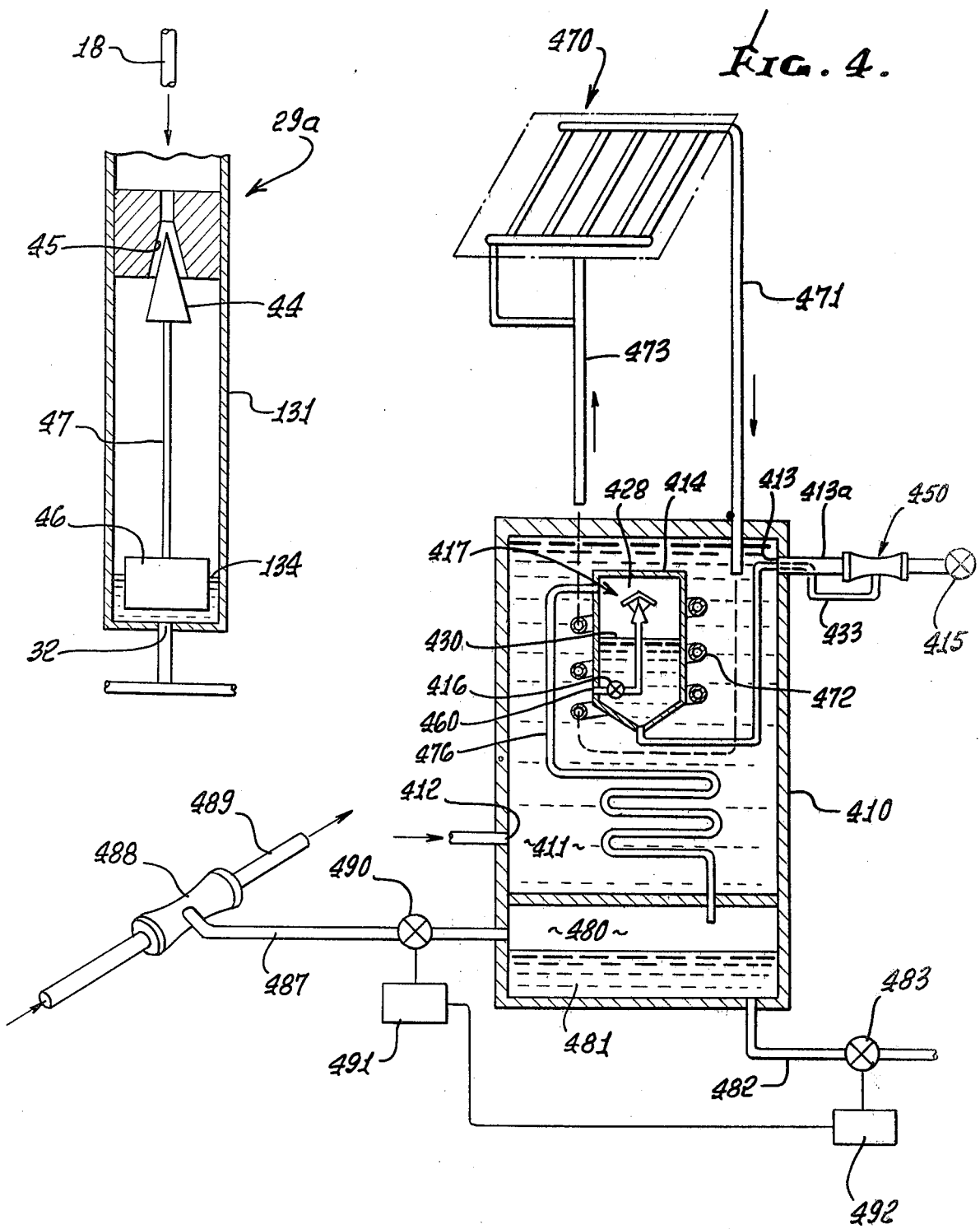

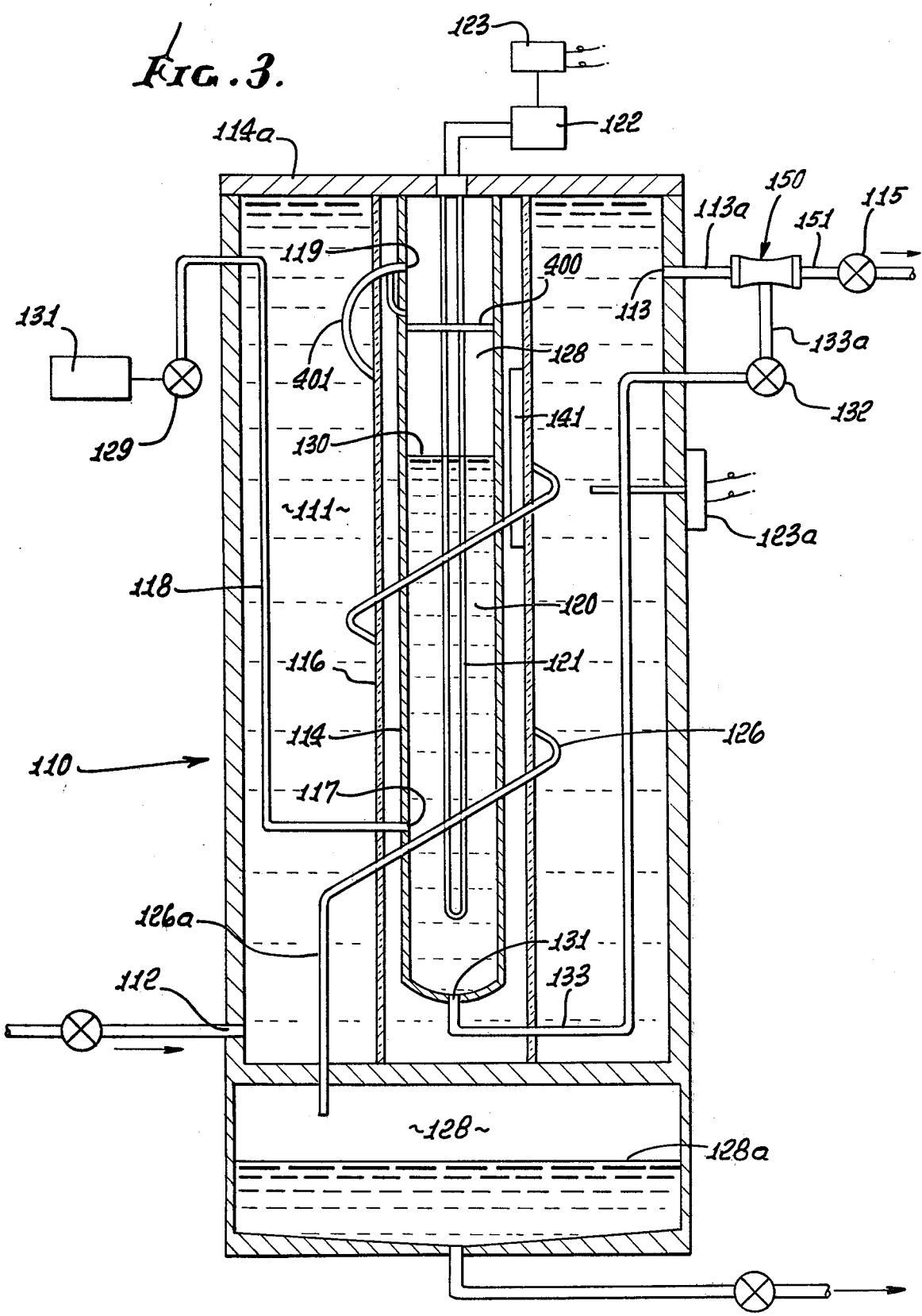

HEATING APPARATUS

BACKGROUND OF THE INVENTION

This invention relates generally to efficient distillation and subsequent heat transfer, and more particularly concerns heating of fluid or liquid in a reservoir, with virtually no loss of heat to the exterior, together with distillation capability.

Commercial and domestic hot water tanks are typically heated by transfer of heat from hot products of combustion, or by electricity or solar means. Such combustion is provided by hydrocarbon fuel delivery to burners associated with flues in the tanks. While water is heated, there is no provision for water distillation. On the other hand, there is critical need, in terms of fuel savings, for such distillation coupled with attendant heat transfer to fluids or liquids in such tanks.

SUMMARY OF THE INVENTION

It is a major object of the invention to meet the above needs with extensive improvements in heat supply, transfer and distillation of water or other liquid.

Basically, the apparatus of the invention embodies:
(a) a steam vessel having an inlet for water and an outlet for steam,
(b) heating means associated with said vessel to heat water therein and produce steam, and
(c) a condenser connected with the vessel outlet to receive steam, the condenser adapted to extend in heat transfer relation with fluid as in a tank to heat that fluid in response to condensation of steam in said condenser, the condenser having a condensate outlet, and
(d) other means to remove solid particles or precipitate or sludge from the vessel.

As will appear, the steam vessel is typically received in a tank which contains the fluid to be heated, so that any heat from the vessel is transferred to fluid typically filling the tank under pressure; an aspirator may be provided to draw the particulate from the steam vessel in response to withdrawal of fluid from the tank; the amount of water in the vessel is typically controlled by regulation of the supply of water to the vessel so as to maintain its surface level between predetermined limits; an external water level sensor such as a "sight tube" (or float valve or other device) may be provided and connected with the vessel to provide a water surface level that tracks the water surface level in the vessel, and the control referred to may then be associated with and regulated by the "tracking" surface level in the receiver; a splash guard means may be located in the tank; and particulate may also be withdrawn from the receiver (water level sensor) by the aspirator referred to.

These and other objects and advantages of the invention, as well as the details of an illustrative embodiment, will be more fully understood from the following description and drawings, in which:

DRAWING DESCRIPTION

FIG. 2 is a view showing a float valve arrangement;

FIG. 3 is an elevation showing modified apparatus; and

FIG. 4 is an elevation showing further modified apparatus.

DETAILED DESCRIPTION

Figure 1:
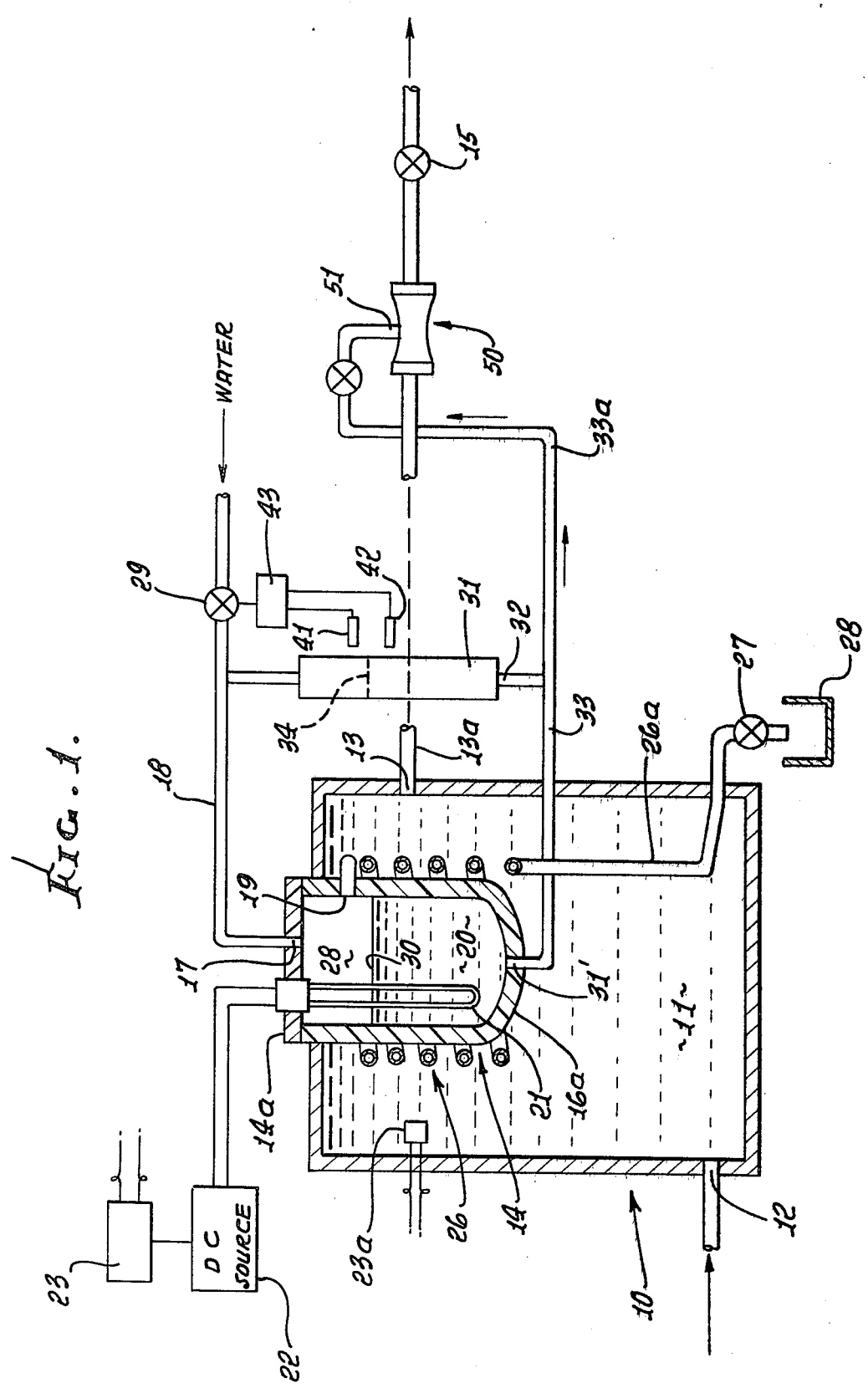
FIG. 1 is an elevation illustrating principle of the invention.

In FIG. 1 a tank 10 contains liquid (such as water) 11 to be heated. It has a lower inlet 12 for supply of pressurized liquid to fill the tank, and an upper outlet 13 to deliver heated liquid to a duct 13a. The latter typically contains a control valve 15 to be opened when hot water flow is required. The tank may be used for domestic or commercial hot water supply purposes. The liquid to be heated may be of any usable type, and may comprise a gas, whereby 11 may also represent fluids, generally.

In accordance with the invention, a pressure vessel, as at 14 for example, may be provided, and it desirably projects into the fluid in tank 10. The wall 16 of the vessel is preferably well insulated, thermally, as indicated at 16a. The vessel has an inlet 17 for water supplied as via duct 18, and an outlet 19 for steam. Heating means is associated with the vessel to heat water 20 therein and produce steam. Such heating means may for example be electrical, as for example a Calrod indicated at 21 as projecting downwardly in the vessel from the cover 14a. A current source is indicated at 22, and may be controlled as by means 23 responsive to a thermostat 23a sensing the fluid temperature in tank 10. Thus, as that fluid temperature drops, the control 23 acts to increase current supply to the Calrod, and vice versa. The heating means may alternatively be from combustible fuel, waste heat or solar derived heat, or geothermal or other renewable supply of heat energy.

A steam condenser is connected with the vessel steam outlet 19 to reduce and condense delivered steam, transferring latent heat to water 11 in the tank. That condenser may with unusual advantage take the form of a coiled metallic (copper for example) duct 26 extending about vessel 14, and immersed in fluid 11 (as for example water or other liquid). The fluid is thereby most efficiently heated, inasmuch as virtually no heat energy is lost to the exterior. Further, the condensate is conducted via duct 26a to the exterior of tank 10, where it may be passed via a valve 27 to a fresh water collector 28.

As was referred to above, make-up water is delivered to vessel 14 via line 18. A control may be operatively connected with the vessel inlet 17 to maintain the amount of water in the vessel within predetermined acceptable limits, so as to provide a steam zone 28 above water 20 in the vessel and communicating with steam outlet 19. That control includes a valve, as at 29 in series with line 18, and a water level sensor connected with that valve to increasingly open it when the water level 30 in the vessel falls, and to increasingly close the valve when the water level rises. As shown in the FIG. 1 example, the sensor may advantageously take the form of a water receiver (such as a sight tube) 31 connected with line 18 downstream of the valve 29, to receive make-up water when water is also delivered to vessel 14. Outlets 31' and 32 at the bottom of vessel 14 and receiver 31 are interconnected by ducting 33 so that the water levels in the vessel and receiver remain approximately the same.

Means is also provided to sense the rise and fall of the water surface level in the receiver. Such means may comprise an electromagnetic beam generator, as for example an "electric eye," directed at the locus of the water surface level. See for example electric eye elements 41 and 42, vertically spaced and directed at locations above and below water surface 34, so that when it drops to the level of elements 42, the valve actuator 43 will be operated to open valve 29, and when surface 34 rises to the level of element 41, actuator 43 will close valve 29. FIG. 2 shows an alternate arrangement, wherein needle valve 29a approaches an annular seat 45 connected to source 18. The receiver 131 (corresponding to receiver 31) contains the sensor in the form of a float 46 floating on water surface level 134 (corresponding to level 34). A rod 47 connects float 46 and stopper 44, to seat the stopper when level 134 rises sufficiently, and to unseat the stopper when level 134 drops. If desired, the sensor may be installed directly in the vessel 14.

The invention also contemplates the provision of other means to remove solid particles, as for example scale and impurities, from the bottom of vessel 14 so as to prevent clogging thereof. In the example, such means includes bottom openings 31 and 32 and duct 33, and structure is connected with the latter to deliver the particles to a stream of hot fluid from tank 10. That structure is shown in the form of an aspirator 50 through which the fluid (as for example hot water) passes, the aspirator shown as connected in series with fluid outlet duct 13a. The side inlet 51 to the aspirator is connected with duct 33, as via duct extension 33a. Accordingly, each time that delivery control valve 15 is opened to provide a stream of hot fluid, particulate accumulated in the lowermost interiors of vessel 14 and receiver 31 is removed by suction flow of small streams of water passing via line 33a to the hot stream delivered to valve 15. This obviates need for a separately driven pump, and provides automatic aspiration on-off control via valve 15. Dissolved salts may also be removed this way.

As is clear, the invention provides a highly efficient and reliable hot fluid delivering system wherein virtually no heat is wasted as by loss to the exterior.

In FIG. 3 a tank 110 contains liquid (such as water) 111 to be heated. It has a lower inlet 112 for supply of pressurized liquid to fill the tank, and an upper outlet 113 to deliver heated liquid to a duct 113a. The latter typically contains a control valve 115 to be opened when hot water flow is required. The tank may be used for domestic or commercial hot water supply purposes. The liquid to be heated may be of any usable type, and may comprise a gas, whereby 111 may also represent fluids, generally.

In accordance with the invention, a pressure vessel, as at 114 for example, may be provided, and it desirably projects into an insulating chamber 116 that is surrounded by the fluid 111 in tank 110. The chamber 116 contains air or other thermal insulating material. The vessel 114 has an inlet 117 for water supplied as via duct 118, and an outlet 119 for steam. Heating means is associated with the vessel to heat water 120 therein and produce steam. Such heating means may for example be electrical, as for example a Calrod indicated at 121 as projecting downwardly in the vessel from the cover 114a. A current source is indicated at 122, and may be controlled as by means 123 responsive to a thermostat 123a sensing the fluid temperature in tank 110. Thus, as that fluid temperature drops, the control 123 acts to increase current supply to the Calrod, and vice versa.

A steam condenser is connected with the vessel steam outlet 119 to reduce and condense delivered steam, transferring latent heat to water 111 in the tank. That condenser may with unusual advantage take the form of a coiled metallic (copper for example) duct 126 extending about vessel 114 and chamber 116, and immersed in fluid 111 (as for example water or other liquid). The fluid is thereby most efficiently heated, and virtually no heat energy is lost to the exterior. Further, the condensate is conducted via duct 126a to the exterior of tank 10, where it may be collected as in fresh water collector 128 beneath the tank 110. See condensate level 128a.

As was referred to above, make-up water is delivered to vessel 114 via line 118. A control may be operatively connected with the vessel inlet 117 to maintain the amount of water in the vessel within predetermined acceptable limits, so as to provide a steam zone 128 above water 120 in the vessel and communicating with steam outlet 119. That control includes a valve, as at 129 in series with line 118, and a suitable water level sensor (indicated at 131) connected with the valve 129 to increasingly open it as the water level 130 in the vessel falls, and to increasingly close the valve as the water level rises. See also splash guard 400 in zone 128 to prevent splashing water contamination of steam exiting at 119. In addition, a return duct 401 is connected to outlet 119 to return to the vessel interior any water that does reach that outlet, the return being by gravity flow.

As before, the invention also contemplates the provision of other means to remove solid particles, as for example scale, precipitate, sludge and other impurities, from the bottom of vessel 114 so as to prevent clogging thereof. In FIG. 3, such means includes bottom opening 131 and duct 133, and structure is connected with the latter to deliver the particles to a stream of hot fluid flowing from tank 110. That structure is shown in the form of an aspirator 150 through which the fluid (as for example hot water) passes, the aspirator shown as connected in series with fluid outlet duct 113a. The side inlet 151 to the aspirator is connected with duct 133, as via duct extension 133a and a control such as a valve 132. Accordingly, each time that delivery control valve 115 is opened to provide a stream of hot fluid, particulate accumulated in the lowermost interior of vessel 114 is removed by suction flow of a small stream of water passing via line 133a to the hot stream delivered to valve 115. This obviates need for a separately driven pump, and provides automatic aspiration on-off control via valve 115.

In FIG. 4, the fluid tank 410 corresponds to tank 10, and has an inlet and outlet at 412 and 413. Steam vessel 414 corresponds to vessel 14. Hot water from tank 410 is supplied via inlet 460 to the vessel 414. Flash evaporation takes place at 417 after water flow through expansion valve 416. Particulate is removed from vessel 414 via duct 433 and aspirator 450. The latter passes hot water from tank outlet 413 to control valve 415, via duct 413a. The latter passes through duct 433 at outlet 413 to require only one outlet 413 instead of two.

A solar panel 470 supplies hot fluid via duct 471 to heater coil 472 immersed in water 411 in tank 140, to heat such water. Return fluid is conducted via duct 473 from coil 472 to the solar panel.

Hot water in vessel 414 boils due to reduced pressure at zone 428 above the water level 430. Vapor or steam (at about 140° F., for example) is conducted via duct 476 to condenser coil 426 in the cooler water in the lower interior of tank 410. Condensate is drained into chamber 480 and collects at 481 for removal at 482, and via valve 483.

Reduced pressure in zone 428 in vessel 414 (as for example about 2 psi) is effected by reducing the pressure in chamber 480. For that purpose, a duct 487 connects chamber 480 with an aspirator 488 in the water main 489. Flow in the latter maintains reduced pressure in zone 428. Valve 490 in duct 487 may be closed when condensate is removed via valve 483. Controls for the valves are shown at 491 and 492, so that when either valve is open, the other is closed.

Vessel 414 may alternatively be located outside tank 410, if desired.

In FIG. 4, water level 430 may be appropriately controlled by valve 416, level sensing means (as in FIG. 1 or FIG. 2) controlling that valve.

We claim:

1. For use in heating fluid, apparatus comprising
   (a) an enclosed steam vessel having an inlet for water and an outlet for steam, and a fluid filled tank containing said vessel, and having a tank inlet and tank outlet,
   (b) heating means associated with said vessel to heat water received therein and produce steam,
   (c) a condenser connected with said vessel outlet to receive steam, said condenser having ductwork extending through the tank in heat transfer relation with said fluid in the tank to heat said fluid in response to condensation of steam in said condenser, the condenser having a condensate outlet, and
   (d) other means to automatically remove solid particles and/or dissolved salts, from the vessel, to deliver said particles and/or salts to a heated fluid stream flowing from the tank outlet.

2. The combination of claim 1 wherein said heating means comprises an electrically energized heater extending in that vessel.

3. The combination of claim 2 wherein said heater comprises a Calrod.

4. The combination of claim 1 wherein said other means includes conduit structure connected to said vessel.

5. The combination of claim 4 wherein said other means includes an aspirator through which said fluid stream passes and into which said solid particles and/or dissolved salts are aspirated.

6. The combination of claim 1 including a control operatively connected with said vessel inlet to maintain the amount of water in said vessel within predetermined limits.

7. The combination of claim 6 wherein said control comprises a valve, and a water level sensor connected to the valve to open the valve when said water level falls and to close the valve when the water level rises.

8. The combination of claim 1 wherein said fluid comprises water.

9. The combination of claim 5 wherein said aspirator is connected in series with a fluid outlet from the tank, the tank also having a fluid inlet.

10. The combination of claim 1 wherein said condensate outlet is outside said tank.

11. The combination of claim 1 wherein said condenser includes a coil extending about said vessel.

12. For use in heating fluid, apparatus comprising
    (a) an enclosed steam vessel having an inlet for water and an outlet for steam, and a fluid filled tank containing said vessel, and having an inlet and outlet,
    (b) heating means associated with said vessel to heat water therein and produce steam, and
    (c) a condenser connected with said vessel outlet to receive steam, said condenser having ductwork extending through the tank in heat transfer relation with said fluid in the tank to heat said fluid in response to condensation of steam in said condenser, the condenser having a condensate outlet,
    (d) a control operatively connected with said vessel inlet to maintain the amount of water in said vessel within predetermined limits, and
    (e) other means to automatically remove solid particles and/or dissolved salts, from the vessel, to deliver said particles and/or salts to a heated fluid stream flowing from the tank outlet.

13. The combination of claim 12 wherein said control comprises a valve, and a water level sensor connected to the valve to open the valve when said water level falls and to close the valve when the water level rises.

14. The combination of claim 13 wherein said fluid comprises water.

15. The combination of claim 1 including a splash guard in said vessel to block removal of splash water via said vessel outlet.

16. The combination of claim 1 including a return duct connection with said vessel outlet to return to the vessel any water that escapes via said outlet.

17. For use in heating fluid, apparatus comprising
    (a) an enclosed pressure vessel having an inlet for liquid and an outlet for vapor, and a fluid filled tank containing said vessel,
    (b) heating means associated with said vessel to heat liquid received therein and produce vapor,
    (c) a condenser connected with said vessel outlet to receive vapor, said condenser having ductwork extending through the tank in heat transfer relation with said fluid in the tank to heat said fluid in response to condensation of vapor in said condenser, the condenser having a condensate outlet and
    (d) other means to automatically remove solid particles and/or dissolved salts, from the vessel to deliver said particles and/or salts to a heated fluid stream flowing from the tank outlet.

* * * * *